United States Patent [19]

Garcia

[11] 4,258,447
[45] Mar. 31, 1981

[54] BOW-RAM

[76] Inventor: Ildefonso Garcia, 318 Lawrence St., Rome, N.Y. 13440

[21] Appl. No.: 262

[22] Filed: Jan. 2, 1979

[51] Int. Cl.³ .............................................. B25D 1/04
[52] U.S. Cl. ...................................... 7/146; 294/19 R
[58] Field of Search .......................... 7/143, 146, 147; 294/19 R, 22–24

[56] References Cited

U.S. PATENT DOCUMENTS

| | | | |
|---|---|---|---|
| 548,420 | 10/1895 | Bauer | 7/146 |
| 2,616,741 | 11/1952 | Ziese | 294/19 R |
| 3,760,656 | 9/1973 | Veach | 7/146 |
| 4,112,530 | 9/1978 | Lecce et al. | 7/146 |

Primary Examiner—James G. Smith
Attorney, Agent, or Firm—Joseph P. Flanagan

[57] ABSTRACT

The invention relates to a bow-ram useful in connection with removing and replacing canvas bows on trucks. The structure of the device comprises an elongated handle carrying a forked portion at one of its ends which forked portion carries a hammer structure thereon, the device being useful for the removal and replacement of canvas bows.

3 Claims, 2 Drawing Figures

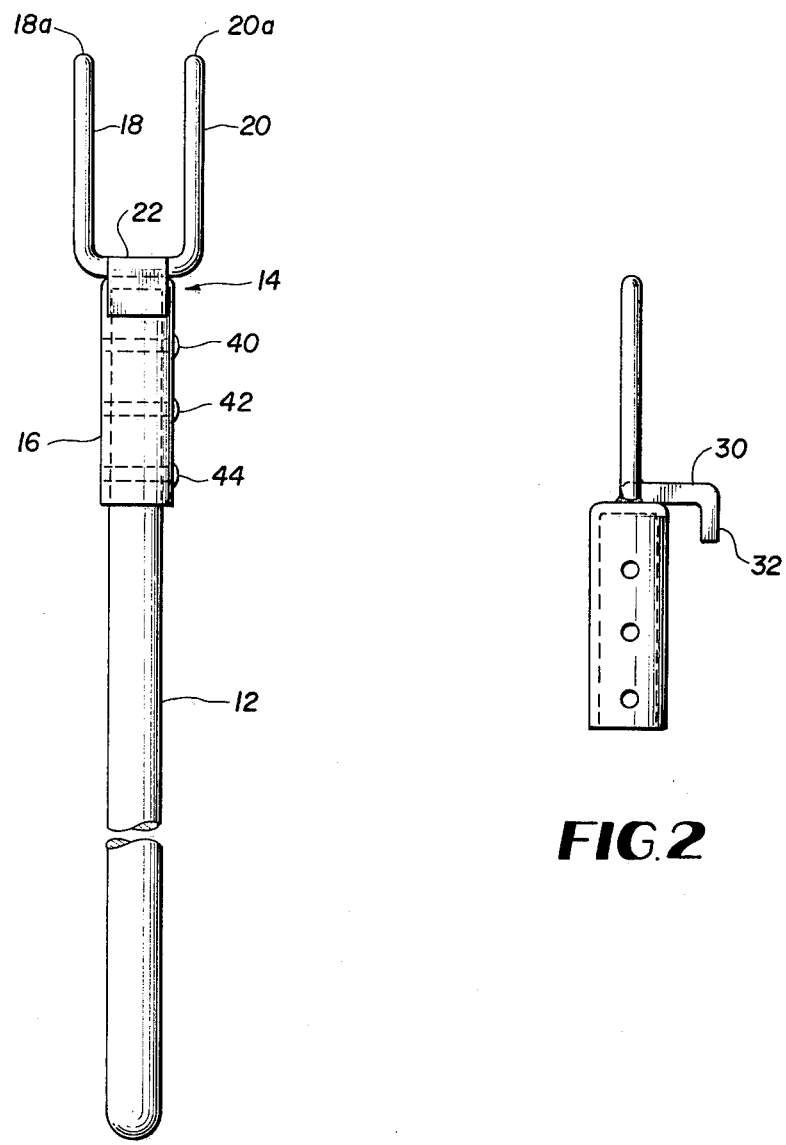

BOW-RAM

The present invention relates to bow-rams useful in connection with the removal and replacement of canvas bows on trucks and is constructed and arranged to provide a unitary tool which can be used to perform operations in removing and replacing canvas bows as opposed to the requirement for a plurality of tools heretofore used to perform such operations.

Prior to the invention of the instant bow-ram it frequently happened that truckers would use hammers, poles, 2 × 4's or other such tools not specially adapted for the removal and replacement of canvas bows, which tools were not as satisfactory in performance as the device of the instant invention and which tools were capable of doing, and often did do, damage to the canvas supported by such bows.

The present device provides a simply constructed reliable unitary device to perform more efficiently the task of removing and replacing canvas bows without damaging the canvas supported by such bows.

The objects and advantages of the invention will become readily apparent from the following description taken in connection with the accompanying drawings wherein:

FIG. 1 is a front view of the device of the instant invention, and

FIG. 2 is a side view of a portion of the device of the instant invention.

The bow-ram of the instant invention comprises an elongated handle member 12, which may be wooden, carrying at one end thereof a forked ram/hammer structure generally indicated by the arrow 14 which may be made of steel.

The ram/hammer member may be a unitary device having a sleeve member 16 of a sufficient diameter to receive one end of the handle member 12. The sleeve member 16 carries, at its upper end, a forked ram structure having side members 18 and 20 joined together by a connecting base portion 22.

The distal ends 18a and 20a of the side members 18 and 20, respectively, are smoothly rounded ball ends for a purpose to be hereinafter explained.

Integral with the lower connecting base member 22 is a hammer structure comprising a member 30 extending perpendicular to the upstanding side members 18 and 20. The member 30, at its distal end, has a downwardly extending portion 32.

The ram/hammer member may be secured to the elongated handle member 12 by means of a plurality of suitable bolts 40, 42, and 44, or by any other suitable means.

The upper ends of the side members 18 and 20 as noted above are smoothly rounded, the purpose being to eliminate any sharp edges or the like which could damage canvas in use of the bow-ram of the instant invention as hereinafter described. Should it be desirable, or necessary, the upper ends of the side members 18 and 20 could carry thereon suitable members, not shown, of rubber, plastic, or any other suitable material, to enhance their canvas-protecting capabilities.

To those skilled in the art, the use of the device of the instant invention should be readily apparent. Suffice it to say that a person removing a bow would grasp the handle member 12 and use the device as a ram using the base connecting member 22 to ram bows out of place for removal. When it is desired to ram the bow ends in the customary sockets, not shown, on a truck, the hammer member 30, 32 would be used.

Handle members 12 may be of various lengths, as desired.

Although in the instant disclosure I have shown a preferred embodiment of my invention, a range of alteration, modification, change, and substitution is intended therein and in some instances some features of the invention may be utilized without a corresponding use of other features. For example, although in the instant embodiment I describe the handle member as being made of wood and the bow-ram member being made of steel, it may be that other suitable materials such as plastic, hard rubber, or the like, or materials not presently known but hereafter developed may be used in forming the components of the instant invention. Further, the connection of the bow-ram member to the handle may be accomplished by any suitable means other than the means herein described.

Accordingly, it is intended that the claims be construed in a manner consistent with the full range of the spirit and scope of the invention herein.

Having thus described my invention, I claim:

1. A bow-ram member comprising an elongated handle member carrying at one end thereof a forked ram structure, said forked ram structure comprising a pair of elongated side members having upper and lower ends, said side members being joined together at their lower ends by a base striking member, said base member carrying hammer means integral therewith, a sleeve member fitted over one end of said handle member and secured thereto, said ram structure secured to said handle member by said sleeve, said side members fixedly secured to said handle member and immovable relative to said handle member, the longitudinal axes of said handle, said sleeve, and said side members all lying in planes parallel to each other.

2. The invention of claim 1 wherein the upper ends of the side members are smoothly rounded.

3. The invention of claim 2 wherein the upper ends of said side members carry protective covering means thereon.

* * * * *